(12) United States Patent
Lee

(10) Patent No.: US 11,942,019 B2
(45) Date of Patent: Mar. 26, 2024

(54) ELECTRONIC APPARATUS AND IMAGE PROCESSING METHOD THEREOF FOR PROCESSING EDID INFORMATION

(71) Applicant: Samsung Electronics Co., Ltd., Suwon-si (KR)

(72) Inventor: Sangeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 17/580,082

(22) Filed: Jan. 20, 2022

(65) Prior Publication Data

US 2023/0040976 A1    Feb. 9, 2023

Related U.S. Application Data

(63) Continuation of application No. PCT/KR2021/016118, filed on Nov. 8, 2021.

(30) Foreign Application Priority Data

Aug. 3, 2021 (KR) .................. 10-2021-0101930

(51) Int. Cl.
*G09G 3/20* (2006.01)
*A63F 13/533* (2014.01)
*G06F 3/14* (2006.01)

(52) U.S. Cl.
CPC ......... *G09G 3/2096* (2013.01); *A63F 13/533* (2014.09); *G06F 3/14* (2013.01);
(Continued)

(58) Field of Classification Search
None
See application file for complete search history.

(56) References Cited

U.S. PATENT DOCUMENTS 7,755,653 B2   7/2010 Takamori
7,948,556 B2   5/2011 Kumakawa
(Continued)

FOREIGN PATENT DOCUMENTS

CN    106060631 A    10/2016
JP    2004191454 A * 7/2004
(Continued)

OTHER PUBLICATIONS

International Search Report with Written Opinion dated May 2, 2022, issued in International Patent Application No. PCT/KR2021/016118.

*Primary Examiner* — Patrick F Valdez
(74) *Attorney, Agent, or Firm* — Jefferson IP Law, LLP

(57) ABSTRACT

An electronic appliance is provided. The electronic appliance includes a communication interface, a memory storing at least one instruction, and a processor which is connected with the memory and the communication interface and controls the electronic apparatus. Here, the processor may, by executing the at least one instruction, based on an event for reading extended display identification data (EDID) stored in the memory at an external apparatus connected through the communication interface occurring, toggle a first signal related to the communication interface, and after the first signal is toggled, monitor a signal output from the external apparatus and identify whether the external apparatus failed to read the EDID information, and based on identifying that the external apparatus failed to read the EDID information, toggle a second signal related to the communication interface.

18 Claims, 16 Drawing Sheets

(52) U.S. Cl.
CPC ............... *A63F 2300/308* (2013.01); *G09G 2320/0693* (2013.01); *G09G 2340/0442* (2013.01); *G09G 2354/00* (2013.01); *G09G 2370/042* (2013.01); *G09G 2370/045* (2013.01); *G09G 2370/12* (2013.01); *G09G 2370/22* (2013.01)

(56) References Cited

U.S. PATENT DOCUMENTS

| | | | |
|---|---|---|---|
| 8,284,312 | B2 | 10/2012 | Suzuki |
| 8,973,024 | B2 | 3/2015 | Kikkawa |
| 9,021,151 | B2 | 4/2015 | Yagi |
| 10,916,217 | B2 | 2/2021 | Oh |
| 11,037,477 | B2 | 6/2021 | Choi et al. |
| 2007/0046697 | A1* | 3/2007 | Hussain ............... G09G 5/006 345/649 |
| 2007/0057931 | A1 | 3/2007 | Takamori |
| 2008/0151119 | A1 | 6/2008 | Suzuki |
| 2009/0150961 | A1* | 6/2009 | Kabuto ............... H04N 19/61 725/118 |
| 2010/0103272 | A1 | 4/2010 | Yagi |
| 2010/0315553 | A1* | 12/2010 | Takatsuji ............... G09G 5/006 348/E9.034 |
| 2011/0113442 | A1 | 5/2011 | Kikkawa |
| 2012/0038655 | A1* | 2/2012 | Kang ............... G09G 5/006 345/530 |
| 2016/0125836 | A1 | 5/2016 | Kim |
| 2016/0299683 | A1 | 10/2016 | Kwon et al. |
| 2017/0280184 | A1* | 9/2017 | Kozuka ............... H04N 21/436 |
| 2018/0102105 | A1* | 4/2018 | Aoki ............... G09G 5/006 |
| 2022/0345773 | A1* | 10/2022 | Choi ............... H04N 21/84 |

FOREIGN PATENT DOCUMENTS

| | | |
|---|---|---|
| JP | 2007-078980 A | 3/2007 |
| JP | 2008-158220 A | 7/2008 |
| JP | 2008-276067 A | 11/2008 |
| JP | 4581012 B2 | 11/2010 |
| KR | 10-0550429 B1 | 2/2006 |
| KR | 10-1255049 B1 | 4/2013 |
| KR | 10-2015-0077215 A | 7/2015 |
| KR | 10-2016-0050296 A | 5/2016 |
| KR | 10-2019-0129579 A | 11/2019 |
| KR | 10-2020-0037530 A | 4/2020 |
| KR | 10-2021-0068892 A | 6/2021 |
| KR | 10-2022-0165395 A * | 6/2021 |
| WO | 2006/043547 A1 | 4/2006 |

\* cited by examiner

ELECTRONIC APPARATUS AND IMAGE PROCESSING METHOD THEREOF FOR PROCESSING EDID INFORMATION

CROSS-REFERENCE TO RELATED APPLICATION(S)

This application is a continuation application, claiming priority under § 365(c), of an International application No. PCT/KR2021/016118, filed on Nov. 8, 2021, which is based on and claims the benefit of a Korean patent application number 10-2021-0101930, filed on Aug. 3, 2021, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus performing communication with an external apparatus, and a controlling method thereof.

2. Description of Related Art

Beyond full high definition (HD) resolutions, contents in resolutions of an ultra HD level are increasing, and accordingly, source apparatuses and sync apparatuses including a high definition multimedia interface (HDMI) port supporting an HDMI 2.0 version or higher are being gradually distributed.

However, as source apparatuses and sync apparatuses in various versions are provided, there are increasing issues of comparability. In particular, in case extended display identification data (EDID) is read at a source apparatus, if an issue of comparability occurs, there is a problem that an error occurs, such as a case wherein there is continuous flickering of the screen, or a case where there is no signal or a wide screen resolution cannot be set, and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that makes a source apparatus read EDID through a calibration work for resolving an issue of comparability with a source apparatus, and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface, a memory storing at least one instruction, and a processor which is connected with the memory and the communication interface and controls the electronic apparatus, wherein the processor may, by executing the at least one instruction, based on an event for reading extended display identification data (EDID) stored in the memory at an external apparatus connected through the communication interface occurring, toggle a first signal related to the communication interface, and after the first signal is toggled, monitor a signal output from the external apparatus and identify whether the external apparatus failed to read the EDID information, and based on identifying that the external apparatus failed to read the EDID information, toggle a second signal related to the communication interface.

Also, the processor may, after the first signal is toggled, based on identifying that the external apparatus failed to read the EDID information, toggle the first signal and the second signal together.

In addition, the processor may, based on the event occurring, change first EDID information stored in the memory into second EDID information, and toggle the first signal, and after the first signal is toggled, based on identifying that the external apparatus failed to read the second EDID information, toggle a second signal related to the communication interface.

Further, the communication interface may further include an input port for receiving an input of a signal output from the external apparatus, and a detection circuit connected to the input terminal, and the detection circuit may include a resistance, and a transistor of which first end is connected with the input port, of which second end is connected to the resistance, and of which third end is connected with the ground. The transistor may be turned on/turned off based on a level of a signal applied to the first end, and the processor may monitor a signal output from the external apparatus based on a level of a signal applied to the second end according to the turning-on/turning-off of the transistor.

Also, the electronic apparatus may further include a display, and the processor may, based on the event according to an input of a user instruction for changing a screen ratio in a preset mode occurring, sequentially toggle the first signal and the second signal, and control the display to display a guide user interface (UI) guiding that an operation for changing a screen ratio is being performed while a calibration work according to the toggling is being performed.

In addition, the processor may control the display to display a first guide UI while a calibration work according to the toggling of the first signal is being performed, and after the first signal is toggled, based on identifying that the external apparatus failed to read the EDID information, control the display to display a second guide UI different from the first guide UI while a calibration work according to the toggling of the second signal is being performed.

Further, the preset mode may be a game mode, and the processor may control the display to display a UI including a menu for changing a screen ratio in the game mode, and based on the event that the menu included in the UI is selected occurring, sequentially toggle the first signal and the second signal.

The first signal may include at least one of a hot plug detect (HPD) signal, a serial data line (SCL) signal in a display data channel (DDC) signal, or a serial clock line (SDA) signal of the DDC, and the second signal may include at least one other of the HPD signal, the SCL signal, or the SDA signal, and a signal output from the external apparatus may include at least one of a clock signal or a display data channel (DDC) signal.

Also, the processor may, based on the event occurring, toggle the HPD signal and the SCL signal together, and after the HPD signal and the SCL signal are toggled, based on identifying that the external apparatus failed to read the EDID information, toggle the HPD signal, the SCL signal, and the SDA signal together.

In addition, the processor may, after the second signal is toggled, based on identifying that the external apparatus failed to read the EDID information, toggle the first signal by changing a duration of the first signal and monitor a signal output from the external apparatus to identify whether the external apparatus failed to read the EDID information.

In accordance with another aspect of the disclosure, a method of controlling an electronic apparatus is provided. The method includes the steps of, based on an event for reading extended display identification data (EDID) stored in a memory at an external apparatus connected through a communication interface occurring, toggling a first signal related to the communication interface, and after the first signal is toggled, monitoring a signal output from the external apparatus and identifying whether the external apparatus failed to read the EDID information, and based on identifying that the external apparatus failed to read the EDID information, toggling a second signal related to the communication interface.

Also, in the step of toggling the second signal, after the first signal is toggled, based on identifying that the external apparatus failed to read the EDID information, the first signal and the second signal may be toggled together.

In addition, in the step of toggling the first signal, based on the event occurring, first EDID information stored in the memory may be changed into second EDID information, and the first signal may be toggled, and in the step of toggling the second signal, after the first signal is toggled, based on identifying that the external apparatus failed to read the second EDID information, a second signal related to the communication interface may be toggled.

Further, the communication interface may include an input terminal for receiving an input of a signal output from the external apparatus, and a detection circuit connected to the input terminal. Also, the detection circuit may include a resistance, and a transistor of which first end is connected with the input terminal, of which second end is connected to the resistance, and of which third end is connected with the ground, and the transistor may be turned on/turned off based on a level of a signal applied to the first end. In this case, in the step of identifying whether the external apparatus failed to read the EDID information, a signal output from the external apparatus may be monitored based on a level of a signal applied to the second end according to the turning-on/turning-off of the transistor.

In addition, the controlling method may further include the steps of, based on the event according to an input of a user instruction for changing a screen ratio in a preset mode occurring, sequentially toggling the first signal and the second signal, and displaying a guide user interface (UI) guiding that an operation for changing a screen ratio is being performed while a calibration work according to the toggling is being performed.

Also, the step of displaying the guide UI may include the steps of displaying a first guide UI while a calibration work according to the toggling of the first signal is being performed, and after the first signal is toggled, based on identifying that the external apparatus failed to read the EDID information, displaying a second guide UI different from the first guide UI while a calibration work according to the toggling of the second signal is being performed.

Further, the preset mode may be a game mode, and the controlling method may further include the step of displaying a UI including a menu for changing a screen ratio in the game mode, and in the step of sequentially toggling the first signal and the second signal, based on the event that the menu included in the UI is selected occurring, the first signal and the second signal may be sequentially toggled.

Also, the first signal may include at least one of a hot plug detect (HPD) signal, a serial data line (SCL) signal in a display data channel (DDC) signal, or a serial clock line (SDA) signal of the DDC, and the second signal may include at least one other of the HPD signal, the SCL signal, or the SDA signal, and a signal output from the external apparatus may include at least one of a clock signal or a display data channel (DDC) signal.

In addition, in the step of toggling the first signal, based on the event occurring, the HPD signal and the SCL signal may be toggled together, and in the step of toggling the second signal, after the HPD signal and the SCL signal are toggled, based on identifying that the external apparatus failed to read the EDID information, the HPD signal, the SCL signal, and the SDA signal may be toggled together.

Further, the controlling method may further include the step of, after the second signal is toggled, based on identifying that the external apparatus failed to read the EDID information, toggling the first signal by changing a duration of the first signal and monitoring a signal output from the external apparatus to identify whether the external apparatus failed to read the EDID information.

According to the aforementioned various embodiments, an issue of comparability that may occur in case EDID reading is needed in a source apparatus as EDID was changed in a sync apparatus can be resolved, and thus a user's convenience is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
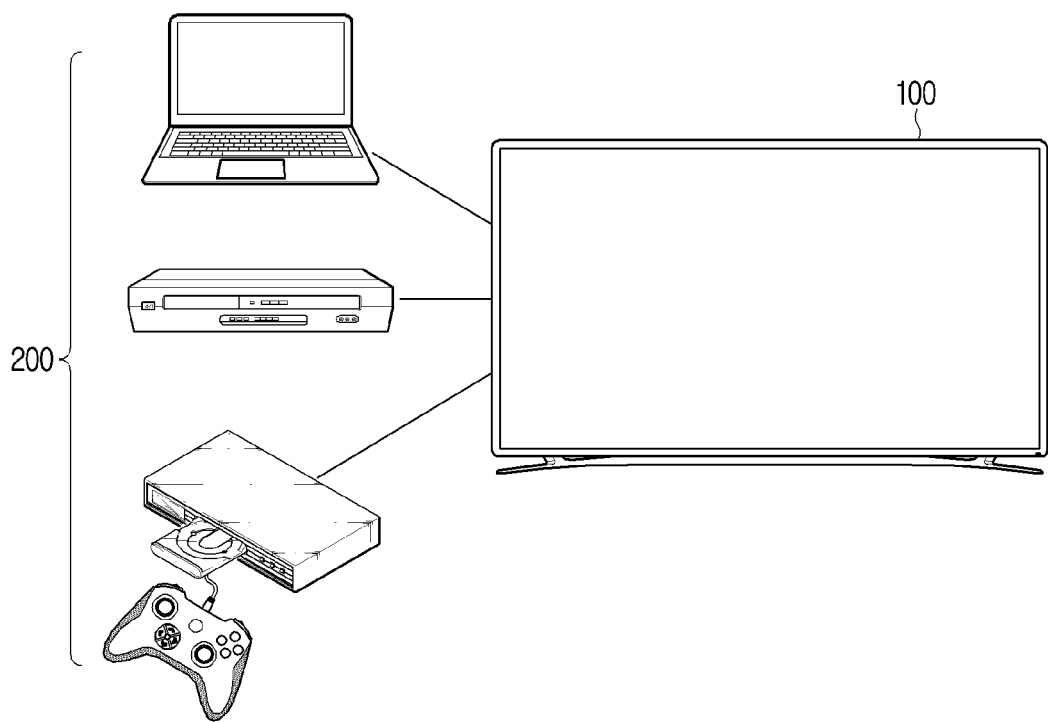
FIG. 1 is a configuration diagram of an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second" and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the other element, and the case where the one element is coupled to the other element through still another element (e.g.: a third element).

Also, singular expressions include plural expressions, as long as they do not obviously mean differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or "parts" may be integrated into at least one module and implemented as at least one processor (not shown), except "modules" or "parts" which need to be implemented as specific hardware.

Hereinafter, an embodiment of the disclosure will be described in more detail with reference to the accompanying drawings.

FIG. 1 is a configuration diagram of an electronic system according to an embodiment of the disclosure.

Referring to FIG. 1, an electronic system includes a sync apparatus 100 and a source apparatus 200.

The source apparatus 200 provides a content to the sync apparatus 100. The source apparatus 200 may be implemented as various types of electronic apparatuses that can provide a content to the sync apparatus 100 such as a set-top box, an over the top (OTT) apparatus, a digital versatile disc (DVD) player, a Blue Ray disc player, a personal computer (PC), a game machine, etc., and the sync apparatus 100 may be implemented as various types of electronic apparatuses (or content output apparatuses) that can output a content provided from the sync apparatus 100 such as a network television (TV), a smart TV, an Internet TV, a web TV, an Internet protocol television (IPTV), signage, a PC, etc.

In particular, the sync apparatus 100 may be implemented as an apparatus supporting a HDMI. Accordingly, the sync apparatus 100 and the source apparatus 200 may include an HDMI port, and perform communication with each other through the port.

The source apparatus 200 may provide a corresponding content to the sync apparatus 100 based on EDID information received from the sync apparatus 100. The EDID is a standard for transmitting display information from the sync apparatus 100, i.e., a display side, to the source apparatus 200, i.e., a host side. The meaning of the EDID does not prescribe an interface signal as a display data channel (DDC), but it defines a data format for making a capability of a display be read at a host. In the EDID, information on the screen ratio, and information on the name of the manufacturer, the manufactured year/month of the product, the type of the product, the EDID version, the resolution and the color coordinate of the product, the type of the phosphor or the filter, the timing, the screen size, the luminance, the pixels, etc. may be included. In particular, the disclosure is implemented such that, in an HDMI standard, resolution information and color information of the sync apparatus 100 are stored through a vender specific data block (VSDB), and the source apparatus 200 reads the VSDB information and transmits a content corresponding thereto to the sync apparatus 100.

For example, the VSDB divides blocks by using an IEEE code, and it includes information on color bits, information on the highest transition minimized differential signaling (TMDS) frequency, information on audio/video latency, etc. The information on color bits means color information, and the information on the TMDS frequency means resolution information, and this is because, the higher the highest TMDS clock frequency is, the more the amount of data that can be transmitted is, and accordingly, high resolution data can be transmitted. The source apparatus 200 may determine a signal in which format the sync apparatus 100 can receive through an HDMI port and output it through the VSDB including such information, and transmit a content in a signal format corresponding thereto.

Figure 2:
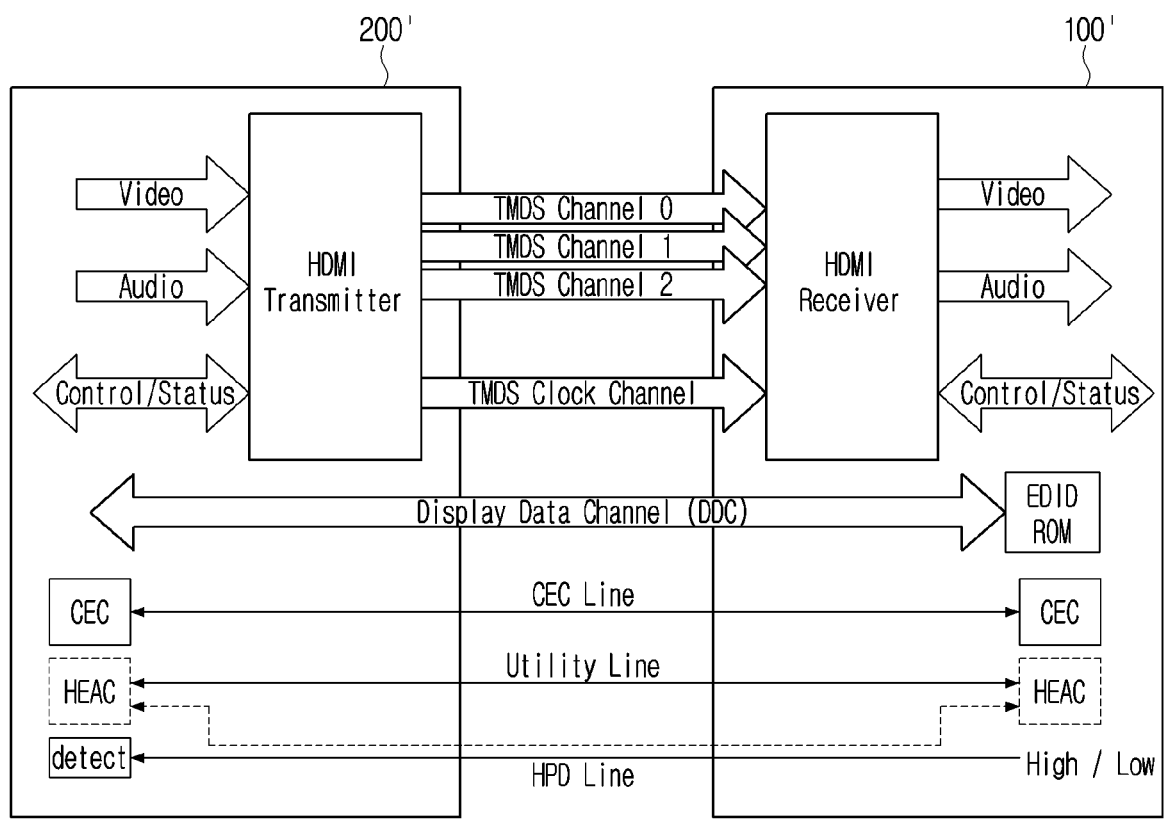
FIG. 2 is a diagram illustrating a configuration of an HDMI cable according to an embodiment of the disclosure.

FIG. 2 is a diagram illustrating a configuration of an HDMI cable according to an embodiment of the disclosure.

Referring to FIG. 2, an HDMI cable may include a transition minimized differential signaling (TDMS) line, a display data channel (DDC) line, a consumer electronic control (CEC) line, a utility line, and a hot plug detect (HPD) line. Specifically, an HDMI cable may include a transition minimized differential signaling (TMDS) channel receiving inputs of video and audio signals, a display data channel (DDC) for receiving inputs of device information and information related to video or audio (e.g., EDID) from a connected external apparatus 200', a consumer electronic control (CEC) line that can transmit a control signal to the external apparatus 200', and a hot plug detect (HPD) line, etc.

Meanwhile, in case an event for reading EDID of the sync apparatus 100' at the source apparatus 200', i.e., an event that stored EDID is changed occurs, the sync apparatus 100' may change a hot plug detect (HPD) signal from a low state to a high state, i.e., perform toggling. This is for making the sync apparatus 100' read the changed EDID information. An HPD signal is a signal standard that determines whether an HDMI cable is connected or released according to the HDMI standard. If the sync apparatus 100' is connected with the source apparatus 200' through an HDMI cable, a voltage detected through a specific pin of an HDMI port, i.e., an HPD signal is transitioned from 0V to a predetermined voltage, e.g., 5V. In this case, the source apparatus 200' recognizes that the HDMI cable is connected, and reads the EDID information of the sync apparatus. If the HPD signal is arbitrarily transitioned from a low state to a high state in accordance thereto, an effect identical to an operation that the HDMI cable is connected after being released is exerted. Accordingly, in case reading of EDID information is needed, an HPD signal may be toggled, and the source apparatus 200' may thereby be made to read EDID information.

Meanwhile, recently, there are cases wherein the sync apparatus 100' is implemented to toggle a display data channel (DDC) signal other than an HPD signal, according to the specification of the sync apparatus 100'. In this case, a case wherein the source apparatus 200' cannot read EDID information may occur. That is, an issue of comparability may occur between the sync apparatus 100' and the source apparatus 200', and accordingly, cases wherein there is continuous flickering of the screen, or wherein there is no signal or a wide screen resolution cannot be set, and the like may occur.

However, according to the disclosure, in case an event of reading the EDID of the sync apparatus 100' at the source apparatus 200' occurs, it may be monitored whether the external apparatus 200' failed to read the EDID, and a calibration work may be performed until the external apparatus 200' succeeds in the EDID reading. Hereinafter, various embodiments of the disclosure will be described in more detail with reference to the accompanying drawings.

Figure 3:
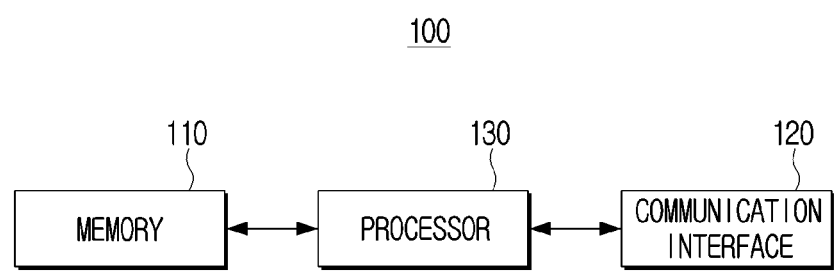
FIG. 3 is a block diagram illustrating a configuration of an electronic apparatus according to an embodiment of the disclosure.

FIG. 3 is a block diagram illustrating a configuration of an electronic apparatus according to an embodiment of the disclosure.

Referring to FIG. 3, the electronic apparatus 100 includes a memory 110, a communication interface 120, and a processor 130. Here, the electronic apparatus 100 may be implemented as the sync apparatus 100' illustrated in FIG. 1. According to an embodiment, the electronic apparatus 100 may be implemented as a form of including a display and outputting a content directly, but in case a display is separately provided, it is possible that the electronic apparatus 100 is implemented as a form of reproducing a content and providing it to the display.

The memory 110 stores EDID information. Here, the EDID information may include extended display identification data (EDID) information of a first HDMI version and EDID information of a second HDMI version. Here, the EDID information of the first HDMI version may include a vendor-specific data block (VSDB) defined in the HDMI standard, and the EDID information of the second HDMI version may include an HDMI Forum (HF)-VSDB. The EDID information may include various information related to the electronic apparatus, as described in FIG. 3.

The memory 110 may be implemented as a memory which can read and write, and which can be accessed from an external source apparatus (e.g., 200' in FIG. 1). For example, the memory 110 may be implemented as an internal memory such as a ROM (e.g., an electrically erasable programmable read-only memory (EEPROM)), a RAM, etc. included in the processor 130, or as a memory separate from the processor 130. In this case, the memory 110 may be implemented in the form of a memory embedded in the electronic apparatus 100, or in the form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100. Meanwhile, in the case of a memory embedded in the electronic apparatus 100, the memory may be implemented in forms such as a flash memory, a non-volatile memory, a volatile memory, a hard disc drive (HDD), or a solid state drive (SSD), etc., and in the case of a memory that can be attached to or detached from the electronic apparatus 100, the memory may be implemented in forms such as a memory card (e.g., a micro SD card, a USB memory, an Embedded MultiMediaCard (eMMC), etc.), an external memory that can be connected to a USB port (e.g., a USB memory), etc.

The communication interface 120 performs communication with an external apparatus (not shown). Here, the external apparatus (not shown) may be implemented as the source apparatus 200' illustrated in FIG. 1. Hereinafter, for the convenience of explanation, explanation will be made based on the assumption of a case wherein an external apparatus is implemented as the source apparatus 200' illustrated in FIG. 1.

The communication interface 120 may be implemented as an HDMI port that can receive high resolution video and multi-channel digital audio through one cable from the external apparatus 200'.

In particular, the communication interface 120 may be implemented as an HDMI input port supporting the HDMI standard. Here, an HDMI port of each version has downward comparability. Thus, it is possible to connect a source apparatus of a higher standard and an output apparatus of a lower standard and use them, or an opposite case is possible. Meanwhile, in this case, only functions corresponding to the lower standard can be used at both apparatuses. As an example, even if the electronic apparatus 100 (e.g., a TV) supports a function related to HDMI 2.1, if the external apparatus 200' (e.g., a Blue Ray player) supports a function related to HDMI 2.0, only the function related to HDMI 2.0 can be used.

Other than the above, the communication interface 120 may receive an input image by a streaming or download method from an external apparatus (e.g., a source apparatus), an external storage medium (e.g., a USB memory), an external server (e.g., a webhard), etc. through communication methods such as various types of digital interfaces, Wi-Fi based on AP (Wi-Fi, a wireless LAN network), Bluetooth, Zigbee, wired/wireless local area networks (LANs), a wide area network (WAN), Ethernet, IEEE 1394, a universal serial bus (USB), a mobile high-definition link (MHL), Audio Engineering Society/European Broadcasting Union (AES/EBU), optical, coaxial, etc. An input image may be a digital image of any one of a standard definition (SD) image, a high definition (HD) image, a full HD image, or an ultra HD image, but is not limited thereto.

The at least one processor 130 (hereinafter, referred to as a processor) is electronically connected with the memory 110 and the communication interface 120, and controls the overall operations of the electronic apparatus 100. The processor 130 may consist of one or a plurality of processors. Specifically, the processor 130 may execute at least one instruction stored in the memory (not shown), and thereby perform operations of the electronic apparatus 100 according to the various embodiments of the disclosure.

According to an embodiment, the processor 130 may be implemented as a digital signal processor (DSP) processing digital image signals, a microprocessor, a graphics-processing unit (GPU), an artificial intelligence (AI) processor, a neural processing unit (NPU), and a time controller (TCON). However, the disclosure is not limited thereto, and the processor 130 may include one or more of a central processing unit (CPU), a micro controller unit (MCU), a micro processing unit (MPU), a controller, an application processor (AP), or a communication processor (CP), and an ARM processor, or may be defined by the terms. Also, the processor 130 may be implemented as a system on chip (SoC) having a processing algorithm stored therein or large scale integration (LSI), or in the form of an application specific integrated circuit (ASIC), or a field programmable gate array (FPGA).

According to an embodiment of the disclosure, if a predetermined event for reading extended display identification data (EDID) stored in the memory 110 at the external apparatus 200' connected through the communication interface 120 occurs, the processor 130 may toggle (or pull up) a first signal related to the communication interface 120. Here, toggling may mean changing a signal from a low state to a high state. Here, the predetermined event may be an event wherein at least one of change of the screen ratio or change of the resolution is required, and for example, it may be an event wherein a user instruction for at least one of change of the screen ratio or change of the resolution is input, but is not limited thereto. For example, various events of changing the stored EDID according to hardware and/or software specifications of the electronic apparatus 100 or the external apparatus 200 may fall under the event.

According to an embodiment, if a predetermined event (hereinafter, referred to as an event) occurs, the processor 130 may change the first EDID information stored in the memory 110 into the second EDID information, and toggle the first signal. The memory 110 may be a flash memory such as an Embedded MultiMediaCard (MMC) that can be accessed at the external apparatus 200' through the communication interface 120, but is not limited thereto.

For example, the processor 130 may change the first EDID information stored in the memory 110 that can be accessed at the external apparatus 200' through the communication interface 120 based on the second EDID information stored in another memory (not shown). According to an embodiment, due to the restriction on the capacity of the memory 110, various resolutions such as 2K, 4K, 8K, etc. may be matched for a screen ratio of 16:9 and stored, and a single resolution of 2K may be matched for a screen ratio of 21:9 and stored in the first EDID information. Also, in the second EDID information, various resolutions such as 2K, 4K, 8K, etc. may be matched for a screen ratio of 21:9 and stored, and a single resolution of 2K may be matched for a screen ratio of 16:9 and stored. Accordingly, if the screen ratio of 21:9 is selected according to a user instruction while the first EDID information is stored in the memory 110, the processor 130 may change the first EDID information into the second EDID information, and provide contents in various resolutions that can be provided by the external apparatus 200', in particular, in high resolutions.

As an example, for changing the first EDID information stored in an area of the memory 110 into the second EDID information, the processor 130 may delete the stored first EDID information, and newly write the second EDID information. However, the disclosure is not limited thereto, and as another example, the processor 130 may overwrite the second EDID information in an area of the memory 110 wherein the first EDID information was previously stored.

Then, after the first signal is toggled, if it is identified that the external apparatus 200' failed to read the second EDID information, the processor 130 may toggle a second signal related to the communication interface 120. According to an embodiment, the first signal may include at least one of a hot plug detect (HPD) signal, a serial data line (SCL) signal in a display data channel (DDC) signal, or a serial clock line (SDA) signal of the DDC, and the second signal may include at least one other of the HPD signal, the SCL signal, or the SDA signal. According to an embodiment, an HPD signal may be pulled up to 5V, and an SCL signal and an SDA signal may be pulled up to 3.3V for toggling, but the disclosure is not limited thereto.

Meanwhile, after the first signal is toggled, the processor 130 may monitor a signal output from the external apparatus 200', and identify whether the external apparatus 200' failed to read the EDID information. According to an embodiment, the processor 130 may monitor at least one of a clock signal or a display data channel (DDC) signal output from the external apparatus 200'.

According to an embodiment, after the first signal is toggled, if it is identified that the external apparatus 200' failed to read the EDID information, the processor 130 may toggle the first signal and the second signal together.

According to an example, if an event occurs, the processor 130 may toggle an HPD signal and an SCL signal together, and after the HPD signal and the SCL signal are toggled, if it is identified that the external apparatus 200' failed to read the EDID information, the processor 130 may toggle the HPD signal, the SCL signal, and the SDA signal together.

According to another example, if an event occurs, the processor 130 may toggle an HPD signal, and after the HPD signal is toggled, if it is identified that the external apparatus 200' failed to read the EDID information, the processor 130 may toggle the HPD signal and the SCL signal together. Even after the HPD signal and the SCL signal are toggled, if it is identified that the external apparatus 200' failed to read the EDID information, the processor 130 may toggle the HPD signal, the SCL signal, and the SDA signal together.

The aforementioned combination of toggling and/or order of toggling of signals may vary according to the specification of the electronic apparatus 100. For example, in case the electronic apparatus 100 has an A specification, an HPD signal and an SCL signal may be toggled first, and in case the electronic apparatus 100 has a B specification, only an HPD signal may be toggled first. Meanwhile, a problem of comparability with the electronic apparatus 100 may occur according to the specification of the external apparatus 200', and thus a calibration work is performed by changing the combination of toggling/or the order of toggling.

According to another embodiment, after the second signal is toggled, if it is identified that the external apparatus 200' failed to read the EDID information, the processor 130 may toggle the first signal by changing the duration (the signal application period or the high level period) of the first signal, monitor a signal output from the external apparatus, and identify whether the external apparatus 200' failed to read the EDID information. Also, even after the duration of the first signal is changed, if it is identified that the external apparatus 200' failed to read the EDID information, the processor 130 may toggle the second signal by changing the duration of the second signal.

According to still another embodiment, after the second signal is toggled, if it is identified that the external apparatus 200' failed to read the EDID information, the processor 130 may toggle the first signal by changing the duration of the first signal as much as a, and if it is identified that the external apparatus 200' failed to read the EDID information, the processor 130 may toggle the first signal by changing the duration of the first signal as much as b.

Meanwhile, the aforementioned toggling order and/or combination, and the order of change of the durations of the first signal and the second signal were just suggested as examples, and the processor 130 may perform a calibration work by combining in various ways the toggling order and/or combination of the first signal and the second signal, the order of change of the durations of the first signal and the second signal, the amount of change of the durations of the first signal and the second signal, etc.

Figure 4A:
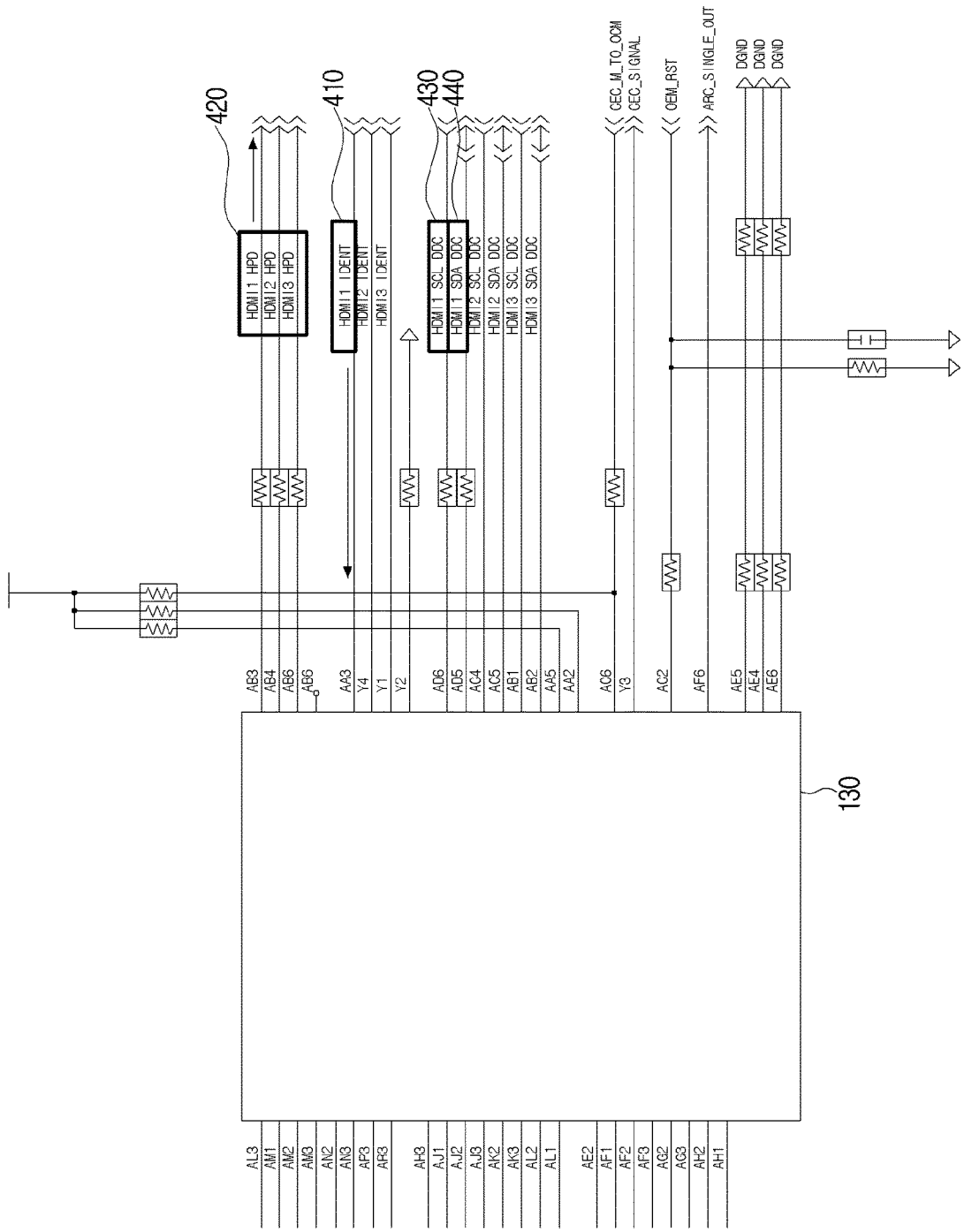
FIGS. 4A and 4B are diagrams for illustrating toggling signals according to various embodiments of the disclosure.
Figure 4B:
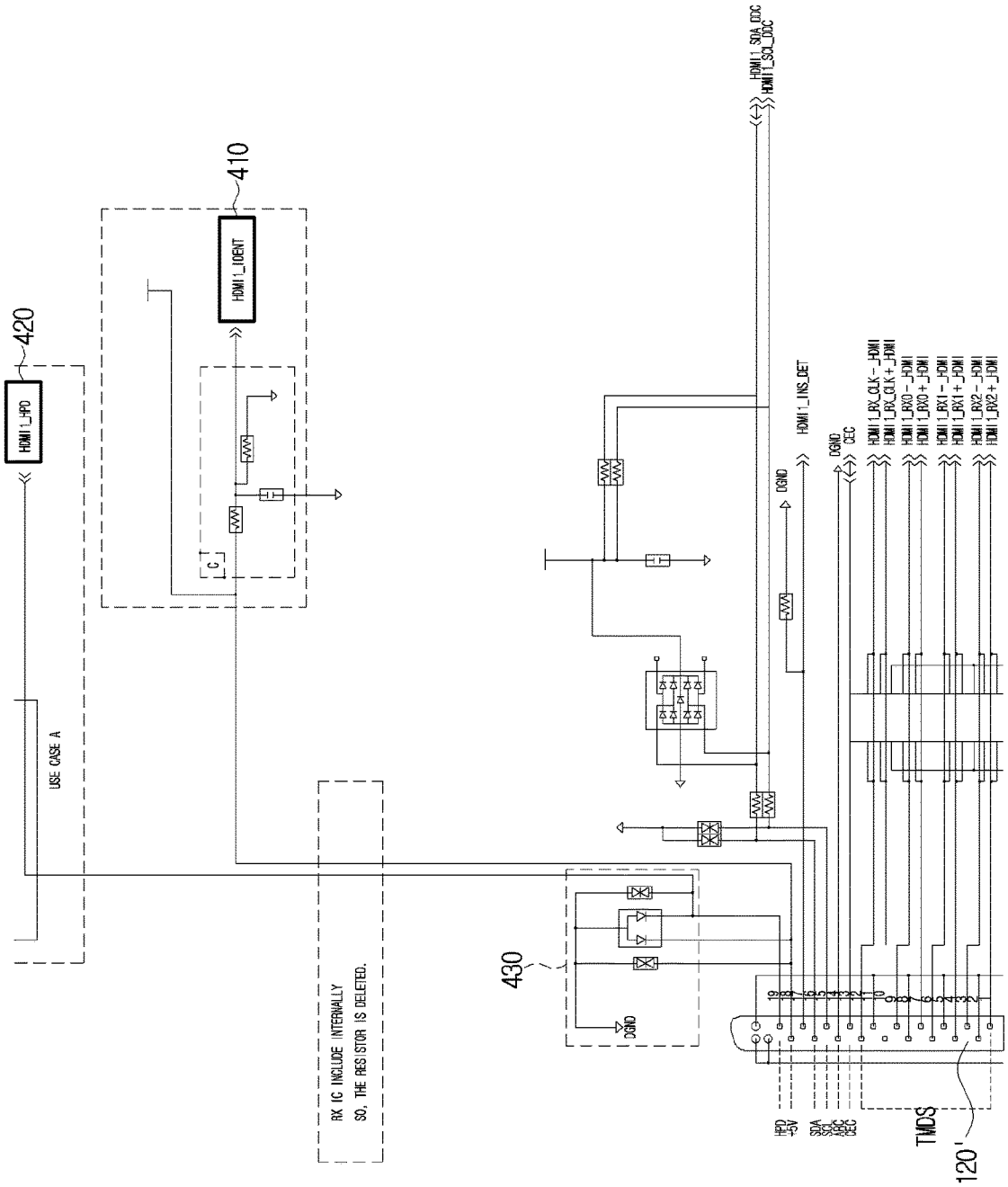

FIGS. 4A and 4B are diagrams for illustrating toggling signals according to various embodiments of the disclosure.

FIG. 4A illustrates a relation between a signal 410 input through the HDMI port 120' and a hot plug detect (HPD) signal 420 output based on the signal.

According to an embodiment of the disclosure, the signal 410 input through the No. 18 pin of the HDMI port 120' as illustrated in FIG. 4A may be controlled as an HPD signal and output through the processor 130 as illustrated in FIG. 4B, and the HPD signal may be output through the No. 19 pin of the HDMI port 120' as illustrated in FIG. 4A.

Meanwhile, depending on implementation examples, it is obvious that an HPD signal can be output through a different pin.

According to another embodiment of the disclosure, it is possible that the processor 130 generates an HPD signal regardless of the signal 410 input through the No. 18 pin of the HDMI port 120'. In this case, the processor 130 may output the HPD signal through the No. 19 pin or a different pin of the HDMI port 120'.

Meanwhile, a serial data line (SCL) signal of a DDC 430 and a serial clock line (SDA) signal of a DDC 440 may also be controlled by a similar method, and they may respectively be output through the No. 15 pin and the No. 16 pin.

Figure 5A:
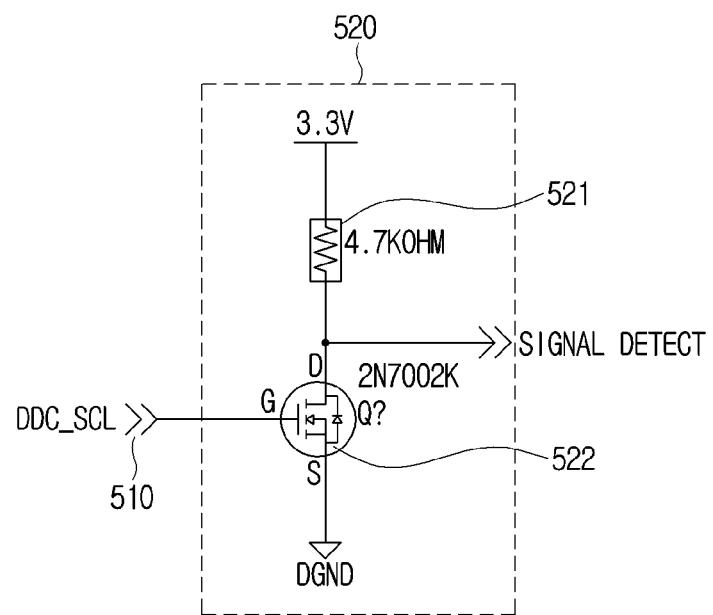
FIGS. 5A and 5B are diagrams for illustrating examples of a detection circuit according to various embodiments of the disclosure.
Figure 5B:
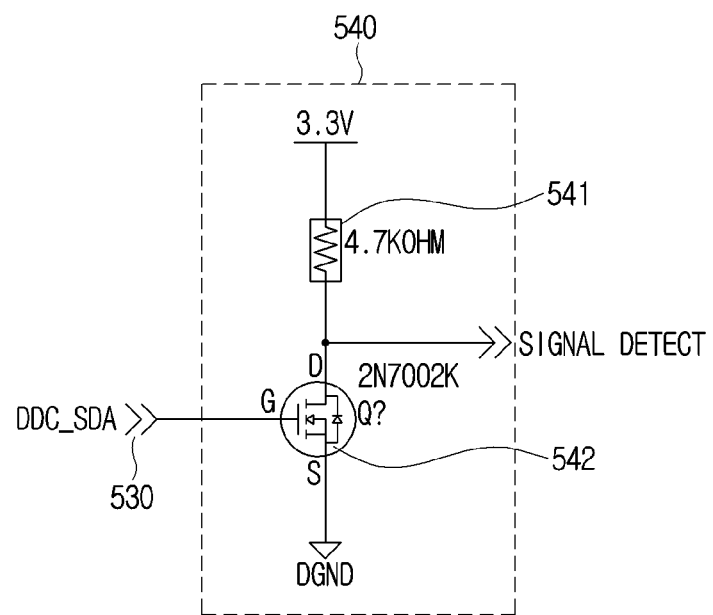

FIGS. 5A and 5B are diagrams for illustrating examples of a detection circuit according to various embodiments of the disclosure.

Referring to FIGS. 5A and 5B, the communication interface 120 may include input ports 510 and detection circuits 520. The detection circuit 520 may be an input port corresponding to a DDC/SCL signal. That is, each of the input ports 510 may be implemented as the No. 15 pin (DDC/SCL) and the No. 16 pin (DDC/SDA) used for transmitting EDID information.

Each of the detection circuits 520 may be implemented to be connected to the input ports 510, and include resistance 521 and transistor 522.

The first ends of the transistor 522 may be connected to the input ports 510, the second ends may be connected to the resistance, and the third ends may be connected to the ground. The transistor 522 may be turned on/turned off based on a level of a signal applied to the first end. The first end may be a gate (G), the second end may be a drain (D), and the third end may be a source (S).

According to an example, the transistor may be implemented as an incremental type N-channel metal-oxide semiconductor (NMOS) as illustrated in FIGS. 5A and 5B, but the disclosure is not limited thereto, and the transistor may be implemented in various forms. An incremental type may be a structure wherein there are no channels made in advance, and thus channels should be made for a normal operation.

In this case, the processor 130 may monitor a signal output from the external apparatus 200' based on a level of a signal applied to the second end according to the turning-on/turning-off of the transistor 522.

According to an example, if the gates (G) of the transistor 522 become a high state higher than a threshold voltage, the transistor 522 are turned on, and a low state, i.e., a ground voltage is detected at the drains (D). Also, when the gates (G) of the transistors 522 become a low state lower than the threshold voltage, the transistor 522 may be turned off, and a high state, i.e., a voltage of 3.3 V may be detected at the drains (D). Based on such an operation, a signal input through an input terminal can be detected.

In case a signal input through the input terminal is a signal corresponding to a case when the EDID was read at the external apparatus 200' (e.g., a stable signal), the processor 130 may determine that the external apparatus 200' read the EDID, and finish the calibration work. According to an example, in case there is no DDC communication, if a voltage in a high state is detected at the drain (D), and a voltage in a low state is detected after toggling of the signal, the processor 130 may determine that the external apparatus 200' read the EDID information. According to another example, a signal corresponding to a case wherein the EDID was read at the external apparatus 200' may be a signal wherein a voltage in a high state and a voltage in a low state are repeated for a threshold number of times or more within a threshold time at the drain (D). However, the disclosure is not limited thereto, and forms of signals may be different according to product implementation examples.

Figure 6:
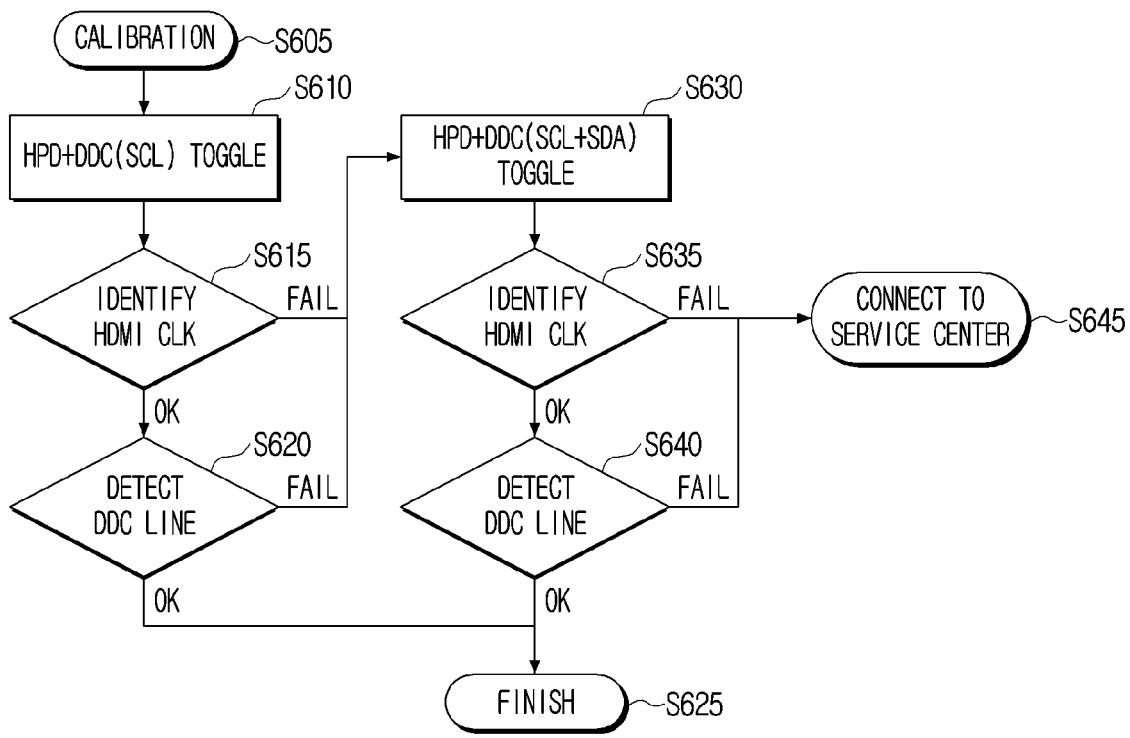
FIGS. 6, 7, and 8 are diagrams for illustrating a method of calibration according to various embodiments of the disclosure.
Figure 7:
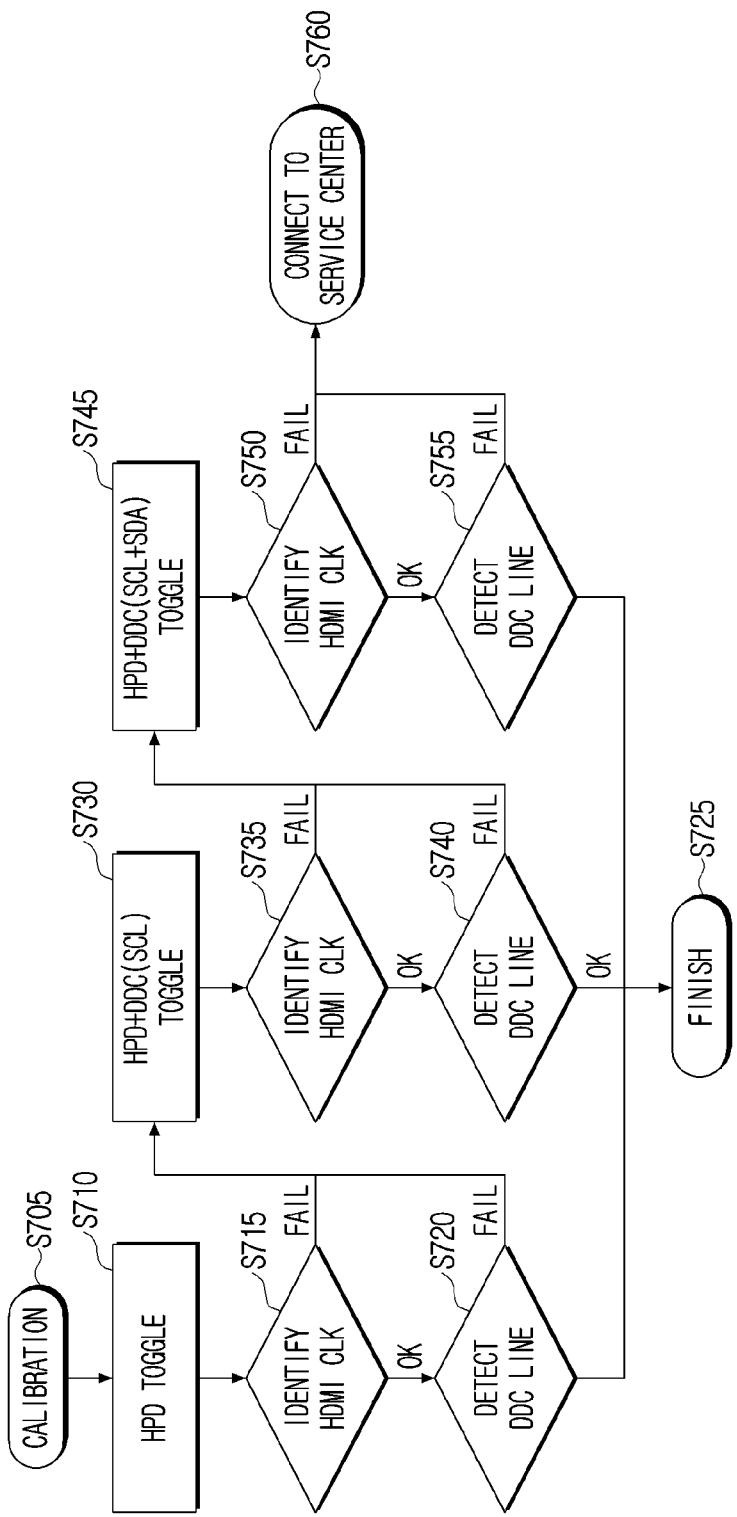
Figure 8:
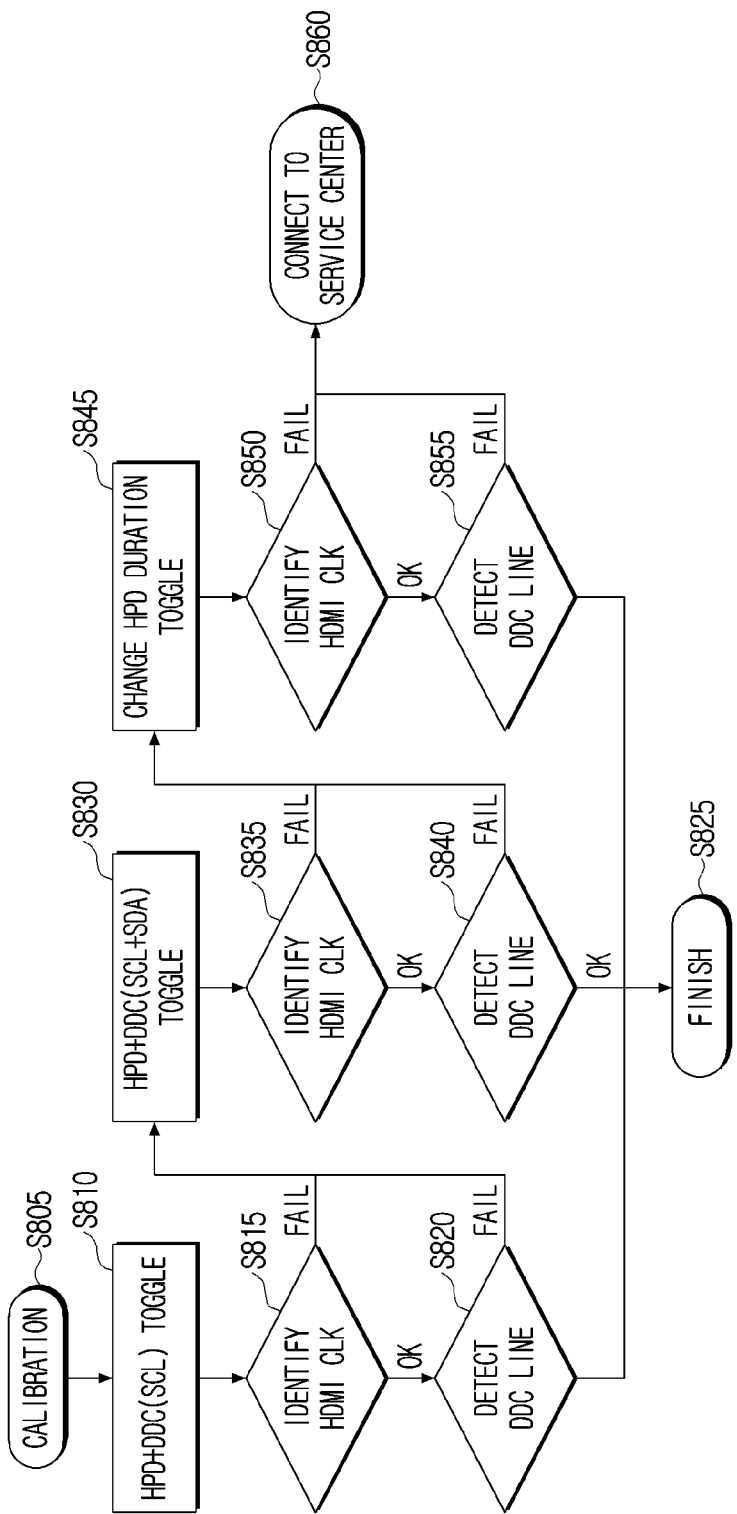

FIGS. 6 to 8 are diagrams for illustrating a method of calibration according to various embodiments of the disclosure.

Referring to FIG. 6, when a calibration work starts according to an embodiment in operation S605, the processor 130 may toggle an HPD signal and a DDC (SCL) signal in operation S610. The calibration work may start as an event for reading the EDID at the external apparatus 200' occurs. For example, the event may be an event wherein a menu for changing the resolution or the screen ratio is selected, but is not limited thereto, and the event may be various events of changing the stored EDID at the sync apparatus 100.

After toggling the HPD signal and the DDC (SCL) signal, the processor 130 may identify whether an HDMI CLK signal is input normally in operation S615. For example, the processor 130 may identify whether an HDMI CLK signal is maintained during a threshold time (e.g., 5 sec).

If it is identified that the HDMI CLK signal is input normally, the processor 130 may identify whether a signal is detected at the DDC line in operation S620. The signal for detection may be a signal corresponding to a case wherein the EDID was read at the external apparatus 200'.

If a signal is detected at the DDC line, the processor 130 may finish the calibration job in operation S625.

In case a signal is not detected at the DDC line, the processor 130 may toggle not only the HPD signal and the DDC (SCL) signal but also the DDC (SDA) signal in operation S630.

After toggling the HPD signal, the DDC (SCL) signal, and the DDC (SDA) signal, the processor 130 may identify whether an HDMI CLK signal is input normally in operation S635.

If it is identified that the HDMI CLK signal is input normally, the processor 130 may identify whether a signal is detected at the DDC line in operation S640.

In case a signal is not detected at the DDC line, the processor 130 may perform a connection to the service center in operation S645. For example, the processor 130 may provide a guide UI for a connection to the service center. The guide UI may include information such as the telephone number, the URL link, etc. of the service center. Meanwhile, if a signal is detected at the DDC line, the processor 130 may finish the calibration work in operation S625.

Referring to FIG. 7, if a calibration work starts according to an embodiment in operation S705, the processor 130 may toggle an HPD signal in operation S710. The calibration work may start as an event for reading the EDID at the external apparatus 200' occurs. For example, the event may be an event wherein a menu for changing the resolution or the screen ratio is selected.

After toggling the HPD signal, the processor 130 may identify whether an HDMI CLK signal is input normally in operation S715. For example, the processor 130 may identify whether an HDMI CLK signal is maintained during a threshold time (e.g., 5 sec).

If it is identified that the HDMI CLK signal is input normally, the processor 130 may identify whether a signal is detected at the DDC line in operation S720. The signal for detection may be a signal corresponding to a case wherein the EDID was read at the external apparatus 200'.

If a signal is detected at the DDC line, the processor 130 may finish the calibration job in operation S725.

In case a signal is not detected at the DDC line, the processor 130 may toggle not only the HPD signal but also the DDC (SCL) signal in operation S730.

After toggling the HPD signal and the DDC (SCL) signal, the processor 130 may identify whether an HDMI CLK signal is input normally in operation S735.

If it is identified that the HDMI CLK signal is input normally, the processor 130 may identify whether a signal is detected at the DDC line in operation S740.

In case a signal is not detected at the DDC line, the processor 130 may toggle not only the HPD signal and the DDC (SCL) signal but also the DDC (SDA) signal in operation S745. Meanwhile, if a signal is detected at the DDC line, the processor 130 may finish the calibration work in operation S725.

After toggling the HPD signal, the DDC (SCL) signal, and the DDC (SDA) signal, the processor 130 may identify whether an HDMI CLK signal is input normally in operation S750.

If it is identified that the HDMI CLK signal is input normally, the processor 130 may identify whether a signal is detected at the DDC line in operation S755.

In case a signal is not detected at the DDC line, the processor 130 may perform a connection to the service center in operation S760. For example, the processor 130 may provide a guide UI for a connection to the service center. The guide UI may include information such as the telephone number, the URL link, etc. of the service center. Meanwhile, if a signal is detected at the DDC line, the processor 130 may finish the calibration work in operation S725.

Referring to FIG. 8, if a calibration work starts according to an embodiment in operation S805, the processor 130 may toggle an HPD signal and a DDC (SCL) signal in operation S810. The calibration work may start as an event for reading the EDID at the external apparatus 200' occurs. For example, the event may be an event wherein a menu for changing the resolution or the screen ratio is selected.

After toggling the HPD signal and the DDC (SCL) signal, the processor 130 may identify whether an HDMI CLK signal is input normally in operation S815. For example, the processor 130 may identify whether an HDMI CLK signal is maintained during a threshold time (e.g., 5 sec).

If it is identified that the HDMI CLK signal is input normally, the processor 130 may identify whether a signal is detected at the DDC line in operation S820. The signal for detection may be a signal corresponding to a case wherein the EDID was read at the external apparatus 200'.

If a signal is detected at the DDC line, the processor 130 may finish the calibration job in operation S825.

In case a signal is not detected at the DDC line, the processor 130 may toggle not only the HPD signal and the DDC (SCL) signal but also the DDC (SDA) signal in operation S830.

After toggling the HPD signal, the DDC (SCL) signal, and the DDC (SDA) signal, the processor 130 may identify whether an HDMI CLK signal is input normally in operation S835.

If it is identified that the HDMI CLK signal is input normally, the processor 130 may identify whether a signal is detected at the DDC line in operation S840.

In case a signal is not detected at the DDC line, the processor 130 may re-toggle the HPD signal by changing the duration of the HPD signal in operation S845. In this case, the HPD signal and the DDC (SCL) signal may be re-toggled together, although not illustrated in the drawings.

After re-toggling the HPD signal, the processor 130 may identify whether the HDMI CLK signal is input normally in operation S850.

If it is identified that the HDMI CLK signal is input normally, the processor 130 may identify whether a signal is detected at the DDC line in operation S855.

In case a signal is not detected at the DDC line, the processor 130 may perform a connection to the service center in operation S860. For example, the processor 130 may provide a guide UI for a connection to the service center. The guide UI may include information such as the telephone number, the URL link, etc. of the service center. Meanwhile, if a signal is detected at the DDC line, the processor 130 may finish the calibration work in operation S825.

In FIG. 6 to FIG. 8 described above, explanation was made based on a case wherein an HPD signal, a DDC (SCL) signal, and a DDC (SDA) signal are toggled in a specific combination and a specific order, but the combination and the toggling order of the HPD signal, the DDC (SCL) signal, and the DDC (SDA) signal may be arbitrarily changed until the calibration work is finished. Also, although only an example wherein the duration of the HPD signal is changed was explained, the durations of the DDC (SCL) signal and/or the DDC (SDA) signal may be changed, and the order of change of the durations, the amount of change, etc. may also be arbitrarily changed until the calibration work is finished.

Returning to FIG. 3, if a user instruction for changing the screen ratio in a preset mode is input according to an embodiment, the processor 130 may perform a calibration work by sequentially toggling the first signal and the second signal. In this case, the processor 130 may control the display 140 (FIG. 11) to display a guide user interface (UI) guiding that an operation for changing the screen ratio is being performed while the calibration work according to the toggling is being performed.

According to an embodiment, the processor 130 may control the display 140 to display a first guide UI while a calibration work according to the toggling of the first signal is being performed. Then, after the first signal is toggled, if it is identified that the external apparatus 200' failed to read the EDID information, the processor 130 may control the display 140 to display a second guide UI different from the first guide UI while a calibration work according to the toggling of the second signal is being performed.

The preset game mode may be a game mode, but the mode is not limited thereto if it is a mode wherein a UI including a menu for changing the screen ratio is provided (e.g., a cinema mode). However, for the convenience of explanation, hereinafter, explanation will be made based on the assumption of a case wherein the preset mode is a game mode.

According to an example, if a menu for changing the screen ratio is selected in the UI provided in the game mode and the screen ratio is changed, the processor 130 may control the display 140 to display a guide UI while performing the aforementioned calibration work.

Figure 9A:
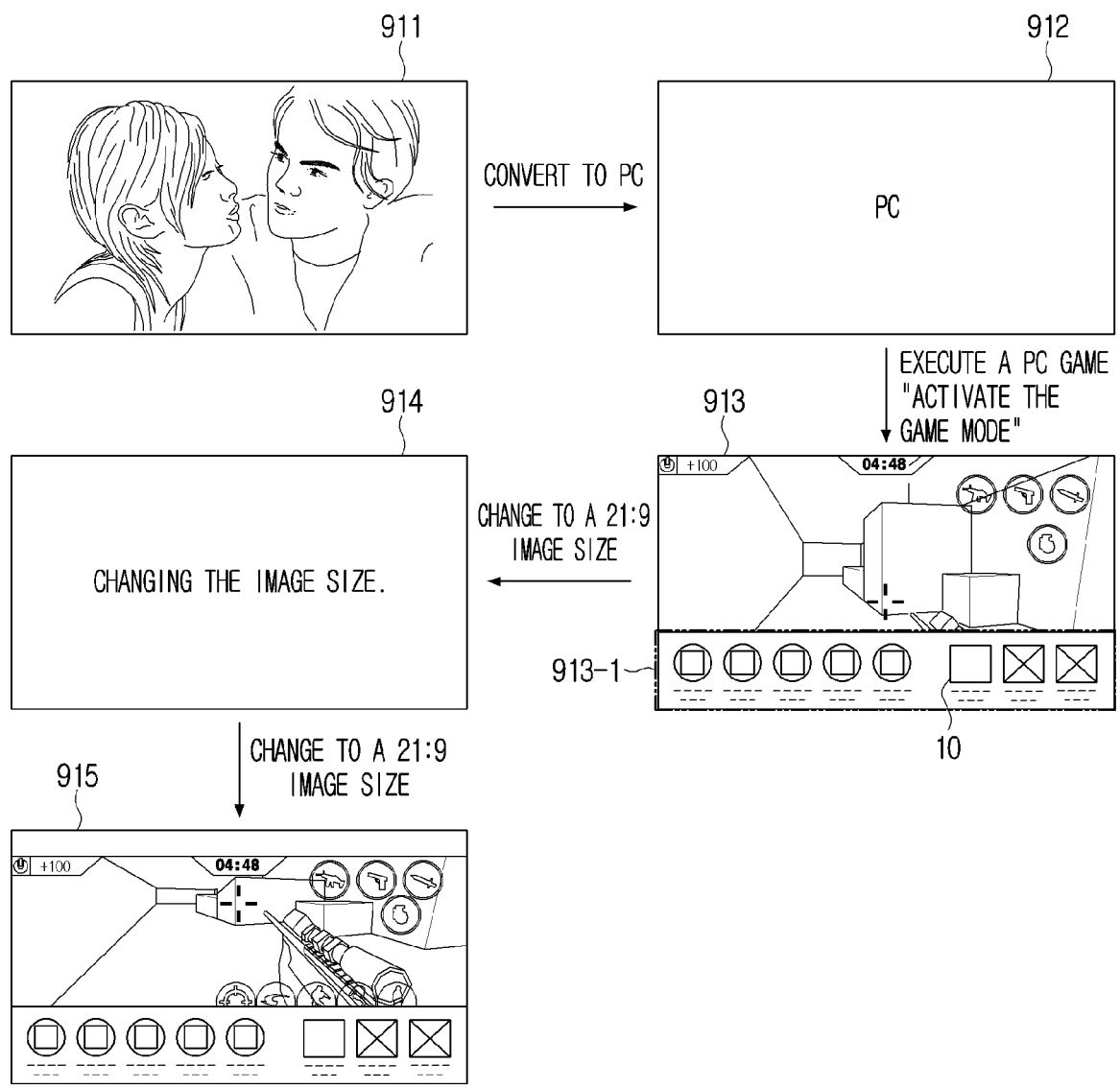
FIGS. 9A, 9B, and 9C are diagrams for illustrating a method of providing a UI according to various embodiments of the disclosure.
Figure 9B:
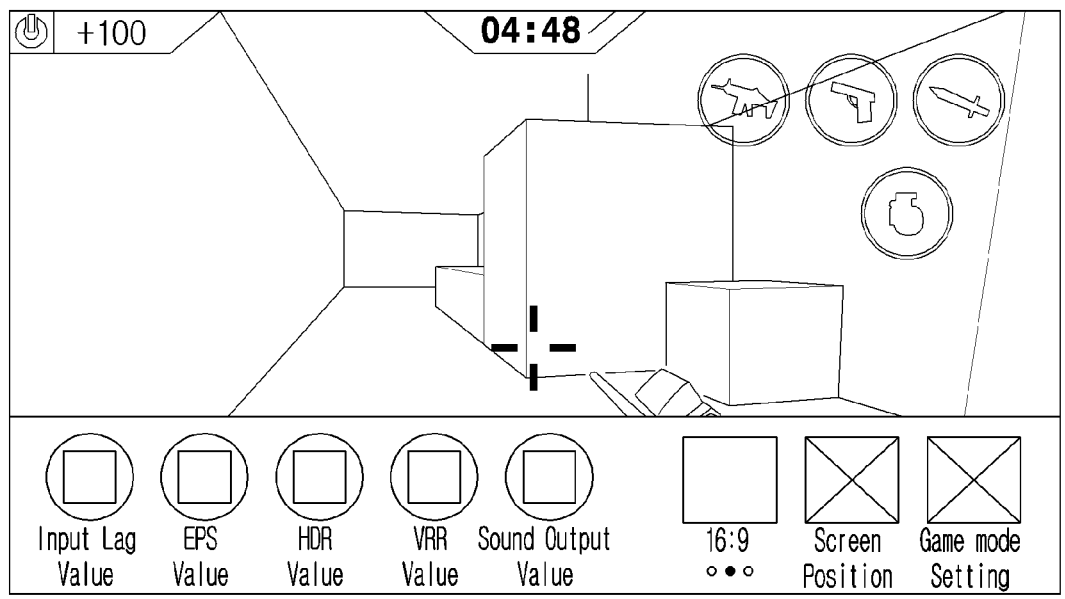
Figure 9C:
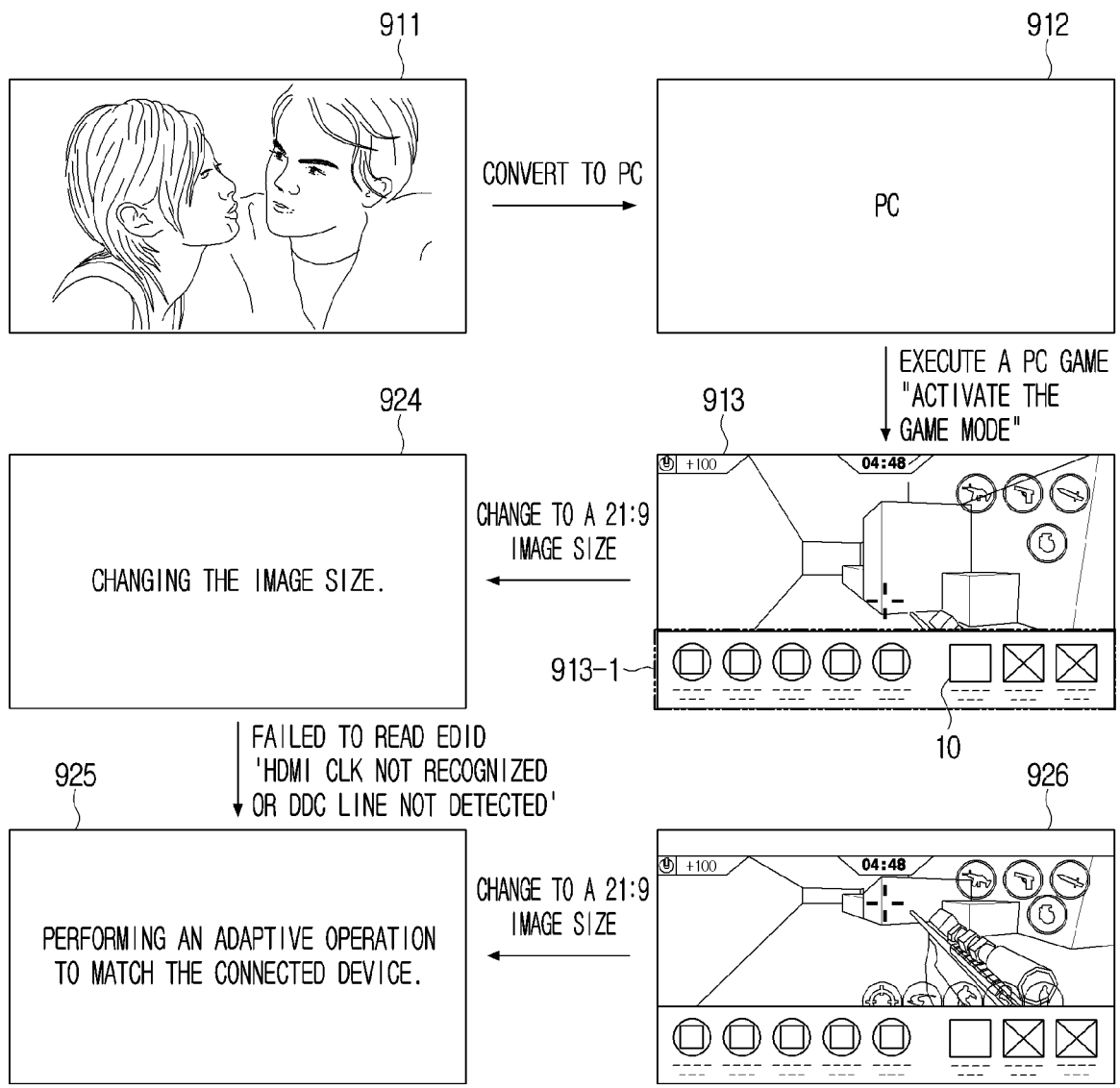

FIGS. 9A to 9C are diagrams for illustrating a method of providing a UI according to various embodiments of the disclosure.

Referring to FIG. 9A, while a real time broadcast content 911 is received and displayed, if a PC input is selected according to a user instruction, the screen may be converted into a PC screen 912, and if a PC game content is selected, the game mode may be activated, and a PC game screen 913 may be provided. The PC game screen 913 may include a UI 913-1 including a plurality of function menus including a menu for changing the screen ratio 10 as illustrated in FIG. 9B.

If the menu for changing the screen ratio 10 is selected according to a user instruction in the UI 913-1, the processor 130 may change the EDID information stored in the memory 110 based on information on the screen ratio changed according to the user instruction. According to an example, due to the restriction on the capacity of the memory 110, various resolutions such as 2K, 4K, 8K, etc. may be matched for a screen ratio of 16:9 and stored, and a single resolution of 2K may be matched for a screen ratio of 21:9 and stored in the first EDID information. Also, in the second EDID information, various resolutions such as 2K, 4K, 8K, etc. may be matched for a screen ratio of 21:9 and stored, and a single resolution of 2K may be matched for a screen ratio of 16:9 and stored. Accordingly, if the screen ratio of 21:9 is selected according to a user instruction while the first EDID information is stored in the memory 110, the processor 130 may change the first EDID information into the second EDID information, and provide contents in various resolutions that can be provided by the external apparatus 200', in particular, in high resolutions.

After changing the EDID information stored in the memory 110, the processor 130 may perform a calibration work through the aforementioned signal toggling. In this case, the processor 130 may provide a guide UI 914 for guiding this to a user while the calibration work is being performed. For example, the guide UI 914 may include a guiding phrase such as "The image size is being changed" as illustrated in the drawing, but the disclosure is not limited thereto.

Then, when the calibration work is finished, i.e., if it is determined that the external apparatus 200' read the changed EDID information, the processor 130 may display a screen 915 providing a content received from the external apparatus 200' in a ratio of 21:9.

Referring to FIG. 9C, if the menu for changing the screen ratio 10 is selected according to a user instruction in the UI 913-1 included in the PC game screen 913, the processor 130 may provide the first guide UI 924 first while a calibration work according to the toggling of the first signal is being performed, and if reading of the EDID fails, the processor 130 may provide a second guide UI 925 different from the first guide UI 924 while a calibration work according to the toggling of the second signal is being performed. That is, while the calibration work according to the first toggling is being performed, the processor 130 may provide the first guide UI 924, and while the calibration work according to the toggling of the later signal is being performed, the processor 130 may provide the second guide UI 925. The first guide UI 924 may be identical to the guide UI 914 illustrated in FIG. 9A, but the disclosure is not limited thereto. The second guide UI 925 may include a guiding phrase implicating that a calibration work is in progress such as "An adaptive operation is being performed to match the connected device," but the disclosure is not limited thereto.

Figure 10:
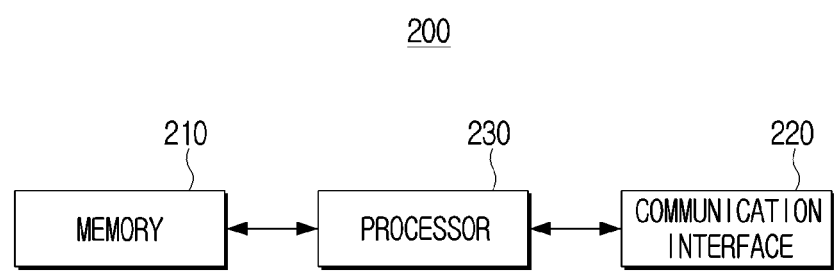
FIG. 10 is a block diagram illustrating a configuration of a source apparatus according to an embodiment of the disclosure.

FIG. 10 is a block diagram illustrating a configuration of a source apparatus according to an embodiment of the disclosure.

Referring to FIG. 10, the source apparatus 200 includes a memory 210, a communication interface 220, and a processor 230. Here, the source apparatus 200 may be implemented as the source apparatus 200' illustrated in FIG. 1.

The memory 210 stores information received from the electronic apparatus 100 temporarily or permanently. The implementation form of the memory 210 is similar to the memory 110 illustrated in FIG. 3.

The communication interface 220 performs communication with the electronic apparatus 100. Here, the electronic apparatus 100 may be implemented as the sync apparatus 100' illustrated in FIG. 1.

Also, the communication interface 220 may be implemented as an HDMI port identical to the communication interface 110 illustrated in FIG. 3. Other than this, the implementation form of the communication interface 220 is similar to the communication interface 110 illustrated in FIG. 3.

If a signal related to the communication interface 220 is changed from a low state to a high state, the processor 230 reads EDID information stored in the memory 110 of the electronic apparatus 100. Also, the processor 230 transmits an image signal corresponding to the read EDID information to the electronic apparatus 100 through the communication interface 220.

According to an embodiment of the disclosure, in case a comparable signal corresponding to the specification of the source apparatus 200 is toggled at the electronic apparatus 100, the processor 230 may read the EDID information. Here, the comparable signal may include at least one of an HPD signal, a DDC (SCL) signal, or a DDC (SDA) signal. For example, the source apparatus 200 may read the EDID information in case only an HPD signal is toggled at the electronic apparatus 100, or read the EDID information in case an HPD signal and a DDC (SCL) signal are toggled together, or read the EDID information in case an HPD signal, a DDC (SCL) signal, and a DDC (SDA) signal are toggled together. Accordingly, the electronic apparatus 100 may make the source apparatus 200 read the EDID information through the aforementioned calibration work.

Figure 11:
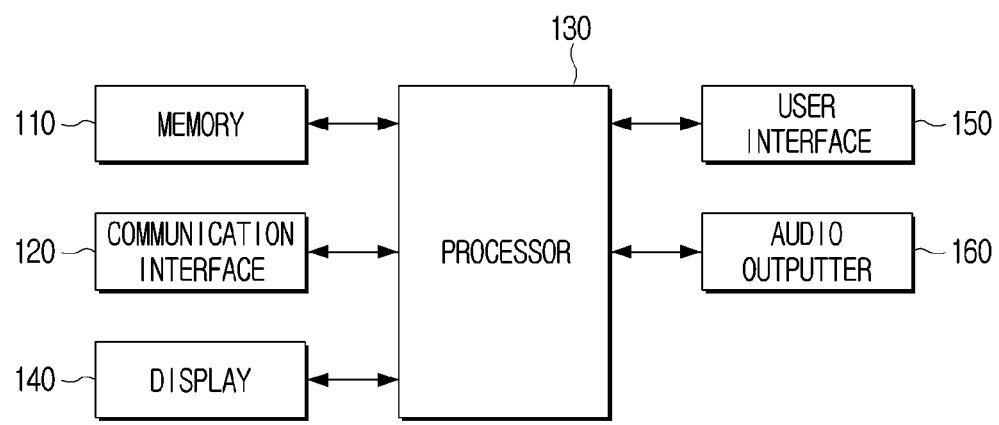
FIG. 11 is a block diagram illustrating a detailed configuration of an electronic apparatus according to an embodiment of the disclosure.

FIG. 11 is a block diagram illustrating a detailed configuration of an electronic apparatus according to an embodiment of the disclosure.

Referring to FIG. 11, the electronic apparatus 100 includes a memory 110, a communication interface 120, a processor 130, a display 140, a user interface 150, and an audio outputter 160. Among the components illustrated in FIG. 11, regarding components overlapping with the components illustrated in FIG. 3, overlapping explanation will be omitted.

The display 140 may be implemented as a display including self-luminous elements, or a display including non-self-luminous elements and a backlight. For example, the display 140 may be implemented as displays in various forms such as a liquid crystal display (LCD), an organic light emitting diodes (OLED) display, light emitting diodes (LED), a micro LED, a mini LED, a plasma display panel (PDP), a quantum dot (QD) display, quantum dot light-emitting diodes (QLED), etc. Inside the display 140, driving circuits that may be implemented in forms such as an a-si TFT, a low temperature poly silicon (LTPS) TFT, an organic TFT (OTFT), etc., a backlight unit, etc. may also be included. Meanwhile, the display 140 may be implemented as a touch screen combined with a touch sensor, a flexible display, a rollable display, a 3D display, a display wherein a plurality of display modules are physically connected, etc. Also, the display 140 has a touch screen embedded therein, and thus it may be implemented such that a program can be executed by using a finger or a pen (e.g., a stylus pen).

The user interface 150 may be implemented as an apparatus like a button, a touch pad, a mouse, and a keyboard, or as a touch screen, a remote control transceiver, etc. that can perform both of the aforementioned display function and a manipulation input function. The remote control transceiver may receive a remote control signal from an external remote control device through at least one communication method among infrared communication, Bluetooth communication, and Wi-Fi communication.

The audio outputter 160 outputs an audio signal. For example, the outputter 160 may convert a digital audio signal processed at the processor 130 into an analogue audio signal and amplify the signal, and output the signal. For example, the outputter 160 may include at least one speaker unit, a D/A converter, an audio amplifier, etc. which can output at least one channel. According to an embodiment, the outputter 160 may be implemented to output various multi-channel audio signals. In this case, the processor 130 may control the outputter 160 to perform enhance processing on an audio signal input to correspond enhance processing of an input image, and output the signal. For example, the processor 130 may convert a two-channel audio signal input into a virtual multi-channel (e.g., a 5.1 channel) audio signal, or recognize the location wherein the sync apparatus 100 is placed and process the signal as a stereoscopic audio signal optimized for the space, or provide an audio signal optimized according to the type (e.g., the genre of the content) of an input image.

The sync apparatus 100 may additionally include a tuner and a demodulator depending on implementation examples. The tuner (not shown) may tune a channel selected by a user in a radio frequency (RF) broadcast signal received through an antenna, or all prestored channels, and receive an RF broadcast signal. The demodulator (not shown) may receive a digital IF (DIF) signal converted at the tuner and demodulate the signal, and perform channel demodulation, etc. According to an embodiment, an input image received through the tuner may be processed through the demodulator (not shown), and then provided to the processor 130 for tone mapping processing according to an embodiment of the disclosure.

Figure 12:
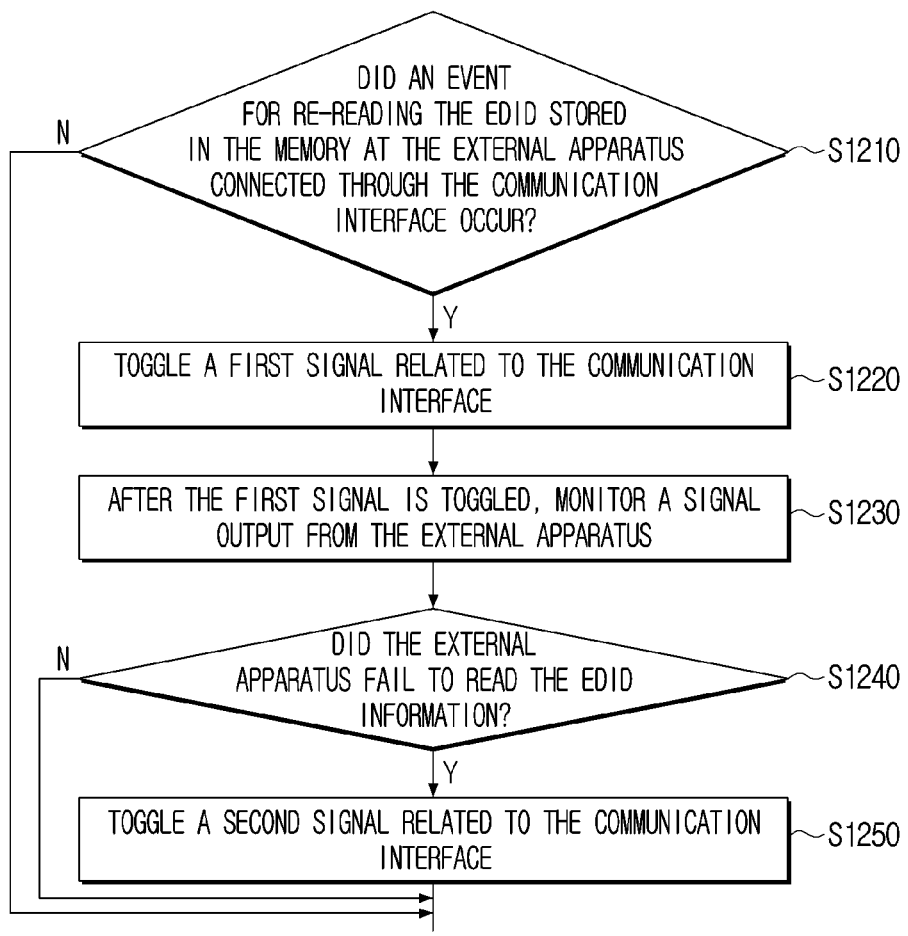
FIG. 12 is a flow chart for illustrating a method of controlling an electronic apparatus according to an embodiment of the disclosure.

FIG. 12 is a flow chart for illustrating a method of controlling an electronic apparatus according to an embodiment of the disclosure.

Referring to FIG. 12, if an event for reading extended display identification data (EDID) stored in the memory at an external apparatus connected through the communication interface occurs in operation S1210: Y, a first signal related to the communication interface is toggled in operation S1220.

After the first signal is toggled, a signal output from the external apparatus is monitored in operation S1230, and it is identified whether the external apparatus failed to read the EDID information in operation S1240.

Then, if it is identified that the external apparatus failed to read the EDID information in operation S1240: Y, a second signal related to the communication interface is toggled in operation S1250.

Also, in the operation S1250, after the first signal is toggled, if it is identified that the external apparatus failed to read the EDID information, the first signal and the second signal may be toggled together.

In addition, in the operation S1220, if an event occurs, first EDID information stored in the memory may be changed into second EDID information, and the first signal may be toggled. Also, in the operation S1250, after the first signal is toggled, if it is identified that the external apparatus failed to read the second EDID information, the second signal related to the communication interface may be toggled.

The communication interface may further include an input terminal for receiving an input of a signal output from the external apparatus, and a detection circuit connected to the input terminal. In this case, the detection circuit may include a resistance, and a transistor of which first end is connected with the input terminal, of which second end is connected to the resistance, and of which third end is connected with the ground, and the transistor may be turned on/turned off based on a level of a signal applied to the first end. In this case, in the operation S1240, a signal output from the external apparatus may be monitored based on a level of a signal applied to the second end according to the turning-on/turning-off of the transistor.

Also, the controlling method may further include the steps of, based on an event according to an input of a user instruction for changing a screen ratio in a preset mode occurring, sequentially toggling the first signal and the second signal, and displaying a guide user interface (UI) guiding that an operation for changing a screen ratio is being performed while a calibration work according to the toggling is being performed.

In addition, the step of displaying the guide UI may include the steps of displaying a first guide UI while a calibration work according to the toggling of the first signal is being performed, and after the first signal is toggled, based on identifying that the external apparatus failed to read the EDID information, displaying a second guide UI different from the first guide UI while a calibration work according to the toggling of the second signal is being performed.

Further, the preset mode may be a game mode, and the controlling method may further include the step of displaying a UI including a menu for changing a screen ratio in the game mode. In this case, if an event that the menu included in the UI is selected occurs, the first signal and the second signal may be sequentially toggled.

The first signal may include at least one of a hot plug detect (HPD) signal, a serial data line (SCL) signal in a display data channel (DDC) signal, or a serial clock line (SDA) signal of the DDC, and the second signal may include at least one other of the HPD signal, the SCL signal, or the SDA signal. Also, a signal output from the external apparatus may include at least one of a clock signal or a display data channel (DDC) signal.

In addition, in the operation S1220, if an event occurs, the HPD signal and the SCL signal may be toggled together, and in the operation S1250, after the HPD signal and the SCL signal are toggled, based on identifying that the external apparatus failed to read the EDID information, the HPD signal, the SCL signal, and the SDA signal may be toggled together.

Also, the controlling method may further include the step of, after the second signal is toggled, based on identifying that the external apparatus failed to read the EDID information, toggling the first signal by changing a duration of the first signal and monitoring a signal output from the external apparatus to identify whether the external apparatus failed to read the EDID information.

According to the aforementioned various embodiments, an issue of comparability that may occur in case EDID reading is needed in a source apparatus as EDID was changed in a sync apparatus can be resolved, and thus a user's convenience is improved.

Also, methods according to the aforementioned various embodiments of the disclosure may be implemented just by software upgrade, or hardware upgrade of electronic apparatuses of the related art.

In addition, the aforementioned various embodiments of the disclosure may be performed through an embedded server provided on an electronic apparatus, or an external server of an electronic apparatus.

Meanwhile, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. The term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components (e.g.: a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. In addition, operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communication interface;

a memory storing at least one instruction; and
a processor which is connected with the memory and the communication interface and controls the electronic apparatus,
wherein, when executing the at least one instruction, the processor is configured to:
  based on an event for reading extended display identification data (EDID) stored in the memory at an external apparatus connected through the communication interface occurring, change the EDID information from first EDID information stored in the memory into second EDID information, and toggle a first signal related to the communication interface,
  after the first signal is toggled, monitor a signal output from the external apparatus and identify whether the external apparatus failed to read EDID information, and
  based on identifying that the external apparatus failed to read the EDID information, toggle a second signal related to the communication interface,
wherein the first signal comprises:
  at least one of a hot plug detect (HPD) signal, a serial data line (SCL) signal in a display data channel (DDC) signal, or a serial clock line (SDA) signal of the DDC,
wherein the second signal comprises:
  at least one other of the HPD signal, the SCL signal, or the SDA signal, and
wherein a signal output from the external apparatus comprises:
  at least one of a clock signal or a display data channel (DDC) signal.

2. The electronic apparatus of claim 1, wherein the processor is further configured to:
  after the first signal is toggled, based on identifying that the external apparatus failed to read the second EDID information, toggle a second signal related to the communication interface.

3. The electronic apparatus of claim 1, wherein the processor is further configured to:
  after the first signal is toggled, based on identifying that the external apparatus failed to read the EDID information, toggle the first signal for a second time and at the same time as the second signal.

4. The electronic apparatus of claim 1, wherein the processor is further configured to:
  based on the event occurring, toggle the HPD signal and the SCL signal together, and
  after the HPD signal and the SCL signal are toggled, based on identifying that the external apparatus failed to read the EDID information, toggle the HPD signal, the SCL signal, and the SDA signal together.

5. The electronic apparatus of claim 1, wherein the processor is further configured to:
  after the second signal is toggled, based on identifying that the external apparatus failed to read the EDID information, toggle the first signal by changing a duration of the first signal and monitor a signal output from the external apparatus to identify whether the external apparatus failed to read the EDID information.

6. An electronic apparatus comprising:
a communication interface;
a memory storing at least one instruction; and
a processor which is connected with the memory and the communication interface and controls the electronic apparatus,
wherein, when executing the at least one instruction, the processor is configured to:
  based on an event for reading extended display identification data (EDID) stored in the memory at an external apparatus connected through the communication interface occurring, change the EDID information from first EDID information stored in the memory into second EDID information, and toggle a first signal related to the communication interface,
  after the first signal is toggled, monitor a signal output from the external apparatus and identify whether the external apparatus failed to read EDID information, and
  based on identifying that the external apparatus failed to read the EDID information, toggle a second signal related to the communication interface,
wherein the communication interface comprises:
  an input port for receiving an input of a signal output from the external apparatus, and
  a detection circuit connected to an input terminal,
wherein the detection circuit comprises:
  a resistance, and a transistor of which a first end is connected with the input port, of which a second end is connected to the resistance, and of which a third end is connected with a ground,
wherein the transistor is turned on or turned off based on a level of a signal applied to the first end, and
wherein the processor is further configured to:
  monitor a signal output from the external apparatus based on a level of a signal applied to the second end according to the turning-on or turning-off of the transistor.

7. An electronic apparatus comprising:
a communication interface;
a memory storing at least one instruction;
a display; and
a processor which is connected with the memory and the communication interface and controls the electronic apparatus,
wherein, when executing the at least one instruction, the processor is configured to:
  based on an event for reading extended display identification data (EDID) stored in the memory at an external apparatus connected through the communication interface occurring, change the EDID information from first EDID information stored in the memory into second EDID information, and toggle a first signal related to the communication interface,
  after the first signal is toggled, monitor a signal output from the external apparatus and identify whether the external apparatus failed to read EDID information, and
  based on identifying that the external apparatus failed to read the EDID information, toggle a second signal related to the communication interface, and
wherein the processor is further configured to:
  based on the event according to an input of a user instruction for changing a screen ratio in a preset mode occurring, sequentially toggle the first signal and the second signal, and
  control the display to display a guide user interface (UI) guiding that an operation for changing a screen ratio is being performed while a calibration work according to the sequential toggling of the first signal and the second signal being performed.

8. The electronic apparatus of claim 7, wherein the processor is further configured to:

control the display to display a first guide UI while a calibration work according to the toggling of the first signal is being performed, and
after the first signal is toggled, based on identifying that the external apparatus failed to read the EDID information, control the display to display a second guide UI different from the first guide UI while a calibration work according to the toggling of the second signal is being performed.

9. The electronic apparatus of claim 7,
wherein the preset mode is a game mode, and
wherein the processor is further configured to:
control the display to display a UI including a menu for changing a screen ratio in the game mode, and
based on the event that the menu included in the UI is selected occurring, sequentially toggle the first signal and the second signal.

10. A method of controlling an electronic apparatus, the method comprising:
based on an event for reading extended display identification data (EDID) stored in a memory at an external apparatus connected through a communication interface occurring, changing the EDID information from first EDID information stored in the memory into second EDID information, and toggling a first signal related to the communication interface;
after the first signal is toggled, monitoring a signal output from the external apparatus and identifying whether the external apparatus failed to read EDID information; and
based on identifying that the external apparatus failed to read the EDID information, toggling a second signal related to the communication interface,
wherein the first signal comprises:
at least one of a hot plug detect (HPD) signal, a serial data line (SCL) signal in a display data channel (DDC) signal, or a serial clock line (SDA) signal of the DDC,
wherein the second signal comprises:
at least one other of the HPD signal, the SCL signal, or the SDA signal, and
wherein a signal output from the external apparatus comprises:
at least one of a clock signal or a display data channel (DDC) signal.

11. The method of claim 10, wherein the toggling the second signal comprises:
after the first signal is toggled, based on identifying that the external apparatus failed to read the second EDID information, toggling a third signal related to the communication interface.

12. The method of claim 10, wherein the toggling the second signal comprises:
after the first signal is toggled, based on identifying that the external apparatus failed to read the EDID information, toggling the first signal for a second time and at the same time as the second signal.

13. The method of claim 10,
wherein the communication interface further comprises:
an input terminal for receiving an input of a signal output from the external apparatus, and
a detection circuit connected to the input terminal,
wherein the detection circuit comprises:
a resistance, and a transistor of which a first end is connected with the input terminal, of which a second end is connected to the resistance, and of which a third end is connected with a ground,
wherein the transistor is turned on or turned off based on a level of a signal applied to the first end, and
wherein the identifying whether the external apparatus failed to read the EDID information comprises:
monitoring a signal output from the external apparatus based on a level of a signal applied to the second end according to the turning-on or turning-off of the transistor.

14. The method of claim 10, further comprising:
based on the event according to an input of a user instruction for changing a screen ratio in a preset mode occurring, sequentially toggling the first signal and the second signal; and
displaying a guide user interface (UI) guiding that an operation for changing a screen ratio is being performed while a calibration work according to the sequential toggling of the first signal and the second signal being performed.

15. The method of claim 14, wherein after the first signal is toggled in a case where the external apparatus fails to read the EDID information, the method further comprises displaying a second guide UI different from the guide UI while the calibration work according to the toggling of the second signal is being performed.

16. The method of claim 14, wherein the displaying of the guide UI while performing the calibration work occurs when a menu for changing the screen ratio is selected in the guide UI provided in a game mode and the screen ratio is changed.

17. The method of claim 14, wherein a message in the guide UI is different depending on an application being executed.

18. The method of claim 10, further comprising:
based on the event occurring, toggling the HPD signal and the SCL signal together; and
after the HPD signal and the SCL signal are toggled, based on identifying that the external apparatus failed to read the EDID information, toggling the HPD signal, the SCL signal, and the SDA signal together.

* * * * *